(12) United States Patent
Frankland (10) Patent No.: US 9,042,816 B2
(45) Date of Patent: May 26, 2015

(54) METHODS AND APPARATUS FOR IMPROVING NFC COIL TUNING BASED ON PROXIMITY TO A REMOTE NFC DEVICE

(71) Applicant: QUALCOMM Incorporated, San Diego, CA (US)

(72) Inventor: Stephen Frankland, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 250 days.

(21) Appl. No.: 13/668,849

(22) Filed: Nov. 5, 2012

(65) Prior Publication Data

US 2014/0127993 A1     May 8, 2014

(51) Int. Cl.
| | |
|---|---|
| H04B 5/00 | (2006.01) |
| H01Q 11/12 | (2006.01) |
| H04B 1/04 | (2006.01) |
| H04B 1/18 | (2006.01) |
| G06K 19/07 | (2006.01) |

(52) U.S. Cl.
CPC .......... *G06K 19/0726* (2013.01); *H04B 5/0056* (2013.01); *H04B 5/0081* (2013.01)

(58) Field of Classification Search
USPC .......... 455/41.1, 41.2, 77, 120, 121, 123, 125, 455/193.1, 193.2; 307/104
See application file for complete search history.

(56) References Cited

U.S. PATENT DOCUMENTS

| | | | |
|---|---|---|---|
| 6,070,803 | A | 6/2000 | Stobbe |
| 6,473,028 | B1 | 10/2002 | Luc |
| 7,541,930 | B2 | 6/2009 | Saarisalo et al. |
| 8,046,080 | B2 | 10/2011 | Von Arx et al. |
| 2009/0146783 | A1 | 6/2009 | Forster |
| 2009/0273454 | A1 | 11/2009 | Onozuka et al. |
| 2010/0244580 | A1* | 9/2010 | Uchida et al. ............. 307/104 |
| 2011/0124286 | A1 | 5/2011 | Tanaka et al. |
| 2011/0217960 | A1 | 9/2011 | Tanaka et al. |
| 2012/0306265 | A1* | 12/2012 | Yamamoto et al. ......... 307/9.1 |
| 2013/0119774 | A1* | 5/2013 | Ichikawa ................. 307/104 |

FOREIGN PATENT DOCUMENTS

EP     0829940 A2     3/1998

OTHER PUBLICATIONS

International Search Report and Written Opinion—PCT/US2013/068525—ISA/EPO—Jan. 30, 2014.
ISO/IEC 14443-3:2011/Amd.1:2011(E) Identification cards—Contactless integrated circuit cards—Proximity cards—Part 3: Initialization and anticollision, AMENDMENT 1: Electromagnetic disturbance handling and single-size unique identifier.

\* cited by examiner

*Primary Examiner* — Nguyen Vo (74) *Attorney, Agent, or Firm* — Charles E. Eggers (57) ABSTRACT

Aspects disclosed herein relate to improving tuning of a NFC coil for operation in one or more modes based on a distance between a NFC device and a remote NFC device. In one example, a NFC device may be configured to detect that a NFC device is within a first threshold of a first distance from a remote NFC device. The NFC device may be further configured to determine whether a NFC coil is tuned for use with a first operational mode associated with the first distance. The NFC device may also be configured to re-tune the NFC coil to the first operational mode based on a determination that the NFC coil is not tuned for use with the first operational mode.

40 Claims, 7 Drawing Sheets

METHODS AND APPARATUS FOR IMPROVING NFC COIL TUNING BASED ON PROXIMITY TO A REMOTE NFC DEVICE

BACKGROUND

1. Field

The disclosed aspects relate generally to communications between devices and specifically to methods and systems for improving tuning of a near field communication (NFC) coil for operation in one or more modes based on a distance between a NFC device and a remote NFC device.

2. Background

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Many such cellular telephones are manufactured with ever increasing computing capabilities, and as such, are becoming tantamount to small personal computers and hand-held PDAs. Further, such devices are enabling communications using a variety of frequencies and applicable coverage areas, such as cellular communications, wireless local area network (WLAN) communications, NFC, etc.

Currently, a NFC coil may be tuned for performance at approximately 40 mm. But at 0 mm distance the coupling can be too high for efficient demodulation of a load modulated signal resulting in distortion to phase and/or amplitude responses. Conversely, a NFC coil that may be tuned for performance at approximately 0 mm may not be able to efficiently demodulate a load modulated signal when devices are held farther apart (e.g., approximately 40 mm).

Thus, improved apparatuses and methods providing mechanisms for tuning a NFC coil for operation in one or more modes based on a distance between a NFC device and a remote NFC device may be desired.

SUMMARY

The following presents a summary of one or more aspects to provide a basic understanding of such aspects. This summary is not an extensive overview of all contemplated aspects, and is not intended to identify key or critical elements of all aspects nor delineate the scope of any or all aspects. Its purpose is to present some concepts of one or more aspects form as a prelude to the more detailed description presented later.

Various aspects are described in connection with improving tuning of a NFC coil for operation in one or more modes based on a distance between a NFC device and a remote NFC device. In one example, a NFC device may be configured to detect that a NFC device is within a first threshold of a first distance from a remote NFC device. The NFC device may be further configured to determine whether a NFC coil is tuned for use with a first operational mode associated with the first distance. The NFC device may also be configured to re-tune the NFC coil to the first operational mode based on a determination that the NFC coil is not tuned for use with the first operational mode.

According to related aspects, a method provides a mechanism for tuning a NFC coil associated with a NFC device for efficient use in different operational modes based on the distance between the NFC device and the remote NFC device. The method can include detecting that a NFC device is within a first threshold of a first distance from a remote NFC device. The method can include determining whether a NFC coil is tuned for use with a first operational mode associated with the first distance. Moreover, the method can include re-tuning the NFC coil to the first operational mode based on a determination that the NFC coil is not tuned for use with the first operational mode.

Another aspect relates to a communications apparatus. The wireless communications apparatus can include means for detecting that a NFC device is within a first threshold of a first distance from a remote NFC device. Further, the communications apparatus can include means for determining whether a NFC coil is tuned for use with a first operational mode associated with the first distance. Moreover, the communications apparatus can include means for re-tuning the NFC coil to the first operational mode based on a determination that the NFC coil is not tuned for use with the first operational mode.

Another aspect relates to a communications apparatus. The apparatus can include a NFC coil tuning module configured to detect that a NFC device is within a first threshold of a first distance from a remote NFC device. The NFC coil tuning module may also be configured to determine whether a NFC coil is tuned for use with a first operational mode associated with the first distance. Moreover, the NFC coil tuning module may also be configured to re-tune the NFC coil to the first operational mode based on a determination that the NFC coil is not tuned for use with the first operational mode.

Another aspect relates to a computer program product, which can have a computer-readable medium comprising code for detecting that a NFC device is within a first threshold of a first distance from a remote NFC device. The computer-readable medium can also include code for determining whether a NFC coil is tuned for use with a first operational mode associated with the first distance. Moreover, the computer-readable medium can also include code for re-tuning the NFC coil to the first operational mode based on a determination that the NFC coil is not tuned for use with the first operational mode.

To the accomplishment of the foregoing and related ends, the one or more aspects comprise features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth to provide a thorough understanding of one or more aspects. It should be understood, however, that such aspect(s) may be practiced without these specific details.

Generally, a NFC device may be configured to perform various interactions with various different remote NFC devices. In operation, different interactions may be performed in an optimal manner with different distances between the NFC device and the remote NFC device. For example, with a point of sale (POS) terminal (e.g., credit card transactions), a magnetic performance may be poor at 0 mm, while with tag reading, a magnetic performance may be efficient at 0 mm. In example, with POS transactions, a magnetic performance may be efficient at 40 mm, while tag reading magnetic performance may be poor at 40 mm.

The words "wireless power" is used herein to mean any form of energy associated with electric fields, magnetic fields, electromagnetic fields, or otherwise that is transmitted between from a transmitter to a receiver without the use of physical electromagnetic conductors.

Figure 1:
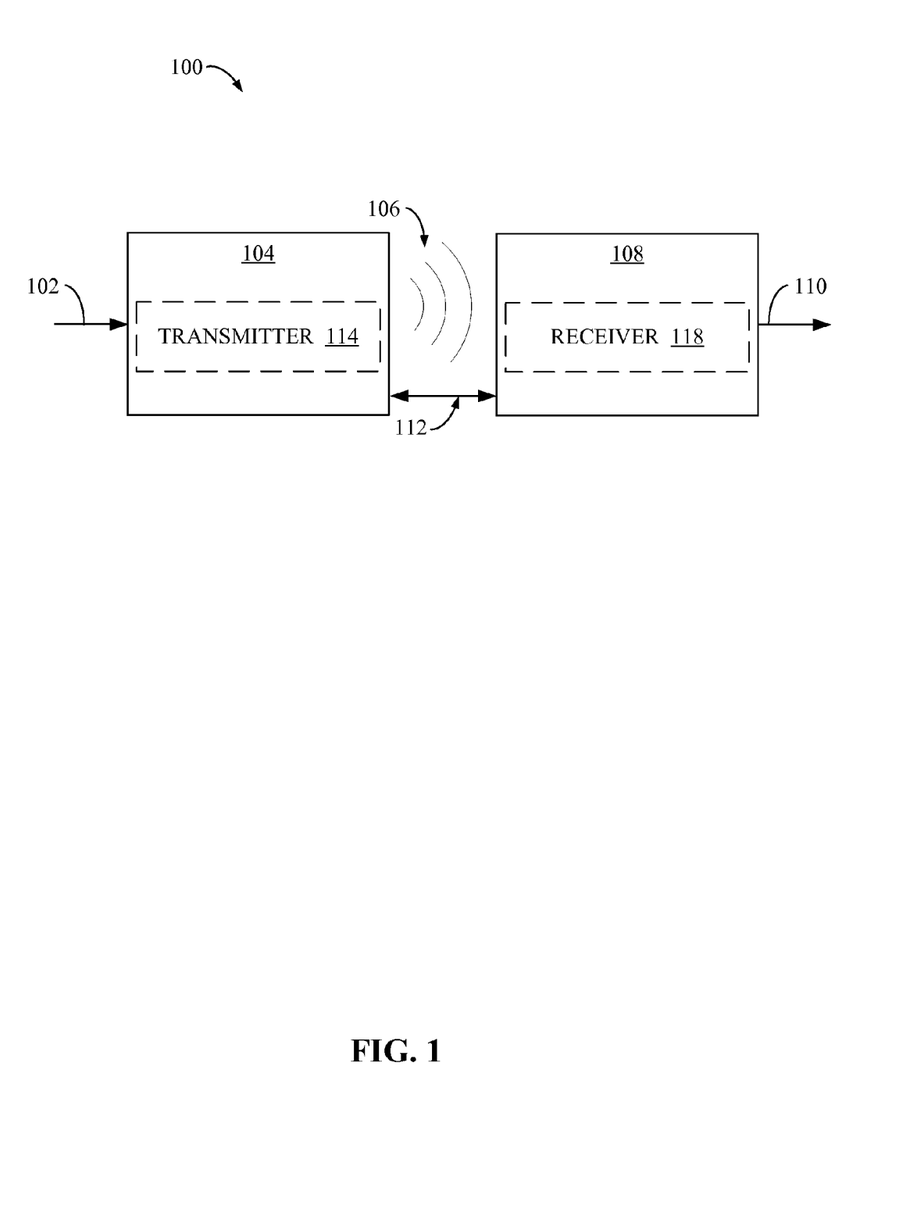
FIG. 1 is a block diagram of a wireless communication system according to an aspect.

FIG. 1 illustrates a wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission. A receiver 108 includes a receive antenna 118 as a means for energy reception. The transmit and receive antennas are sized according to applications and devices associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
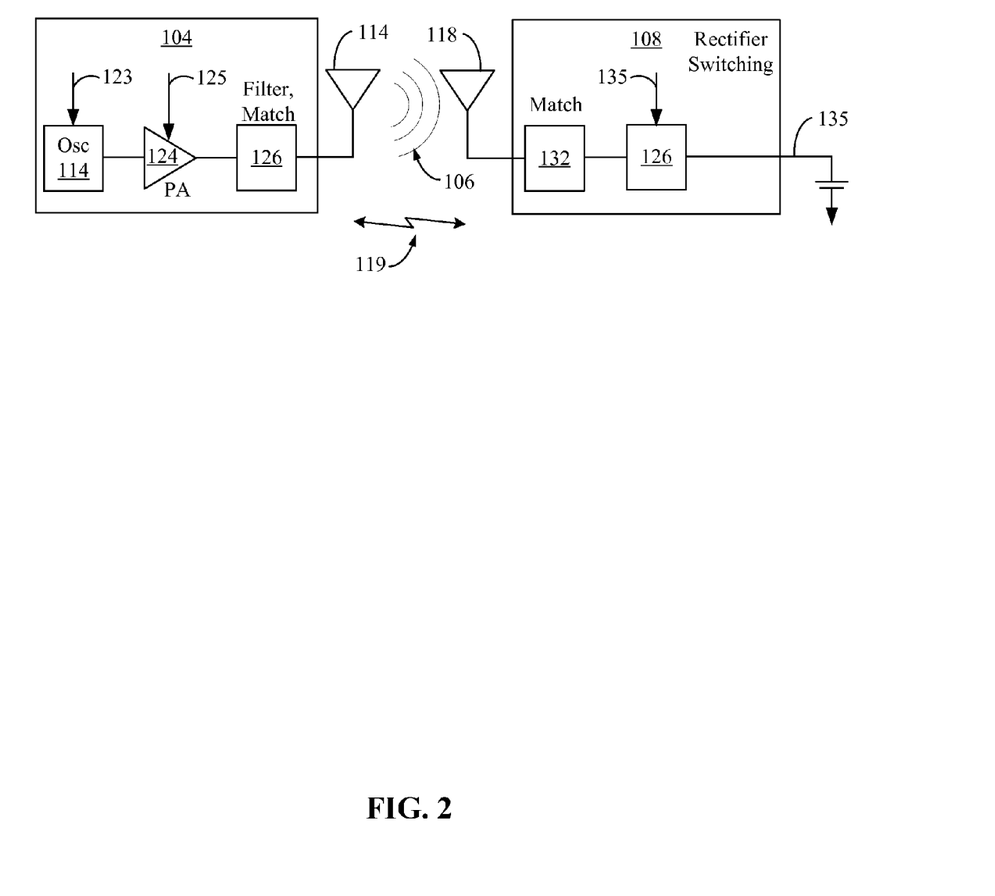
FIG. 2 is a schematic diagram of a wireless communication system, according to an aspect.

FIG. 2 is a schematic diagram of an example near field wireless communication system. The transmitter 204 includes an oscillator 222, a power amplifier 224 and a filter and matching circuit 226. The oscillator is configured to generate a signal at a desired frequency, which may be adjusted in response to adjustment signal 223. The oscillator signal may be amplified by the power amplifier 224 with an amplification amount responsive to control signal 225. The filter and matching circuit 226 may be included to filter out harmonics or other unwanted frequencies and match the impedance of the transmitter 204 to the transmit antenna 214.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

Figure 3:
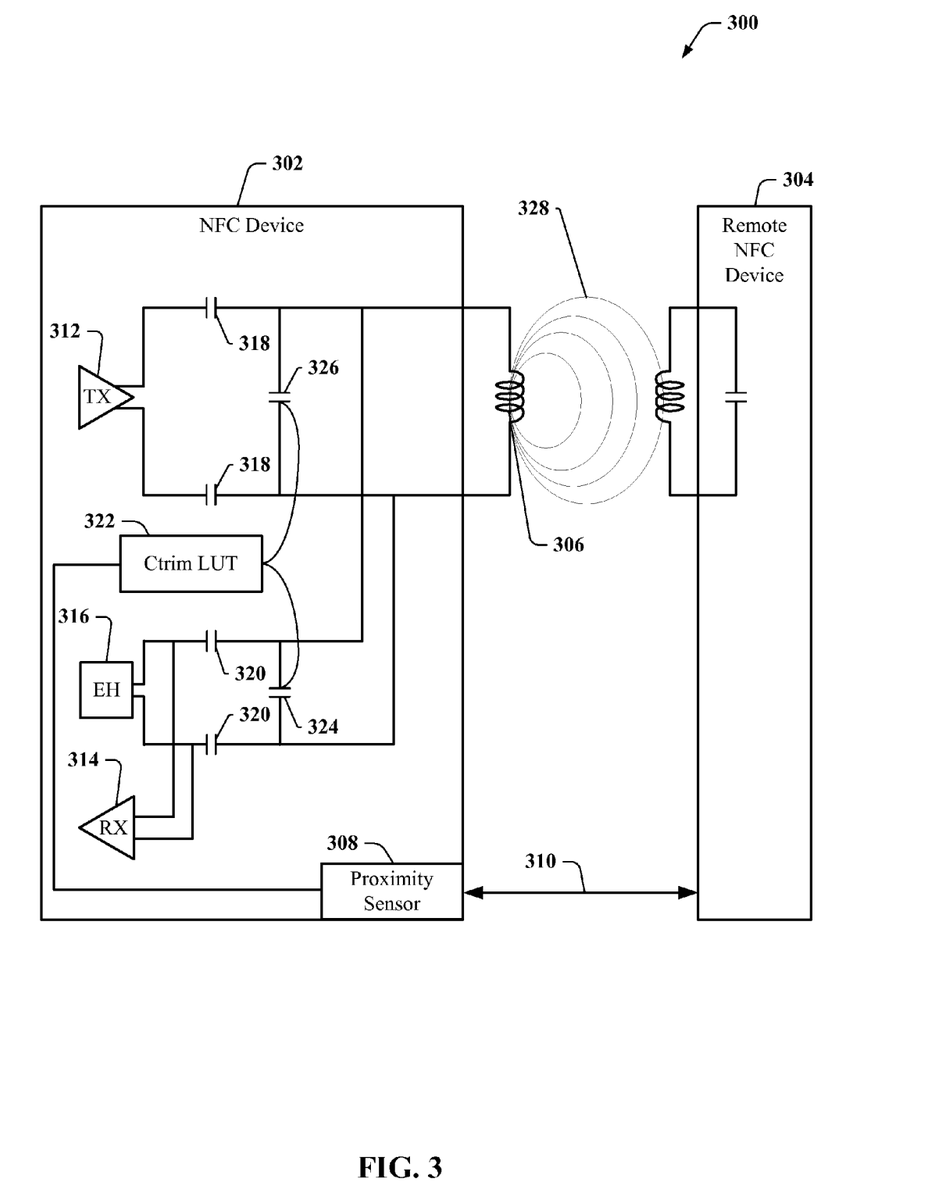
FIG. 3 is a block diagram of a NFC environment, according to an aspect.

With reference to FIG. 3, a block diagram of a communication network 300 according to an aspect is illustrated. Communication network 300 may include a NFC device 302 and a remote NFC device 304 that may be configured to communication using NFC.

NFC device 302 may include a NFC antenna coil 306 configured to facilitate NFC communications with remote NFC device 304. Further, NFC device 302 may include a proximity sensor 308 configured to measure a distance 310 between the NFC device 302 and the remote NFC device 304.

As part of NFC communications, NFC antenna coil 306 may generate an electromagnetic field in the area around the NFC antenna coil 306. The strength of the field may depend on the power source and the size and number of turns in NFC antenna coil 306. Further, impedance mismatches may cause a range of amplitude/phase changes dependant on size and inductance of NFC antenna coil 306 in the magnetic field 328. Capacitor 326 may be connected in parallel with the NFC antenna coil 306, where a transmitter component 312 and capacitors 318 may form an RLC oscillator establishing a resonant circuit with a frequency that corresponds to one or more transmission frequencies of the NFC device 302. Because the wavelength of the frequency used is several times greater than the close proximity distance between the NFC antenna coil 306 and the remote NFC device's 304 antenna coil, the electromagnetic field can be treated as an alternating magnetic field 328. This region of close proximity is referred to as the near field region. The NFC device 302 and remote NFC device 304 may be linked by their mutual inductance, as in a transformer, with the primary coil being the NFC antenna coil 306 and the secondary coil being the remote NFC device's 304 coil. The alternating magnetic field 328 penetrates the remote NFC device's 304 coil when it is in the near field region, inducing an alternating current in the remote NFC device's 304 coil.

When operating in a listening mode, the NFC antenna coil 306, capacitors 320, energy harvester 316 and a receiver component 314 may form an RLC oscillator establishing a resonant circuit tuned to the transmission frequency of the remote NFC device 304. When the resonant frequency of the remote NFC device 304 corresponds to the transmission frequency of the NFC device 302, this draws energy from the magnetic field 328. This additional power consumption manifests itself in the NFC device 302 as a voltage drop through the supply current to the NFC antenna coil 306. Receiver component 314 may represent a variable load resistance to the NFC antenna coil 306. If the receiver component 314 switches its variable load resistance on and off, this changes the resonant frequency so that it does not correspond to the transmission frequency of the remote NFC device 304, which then may detected as a voltage change by the remote NFC device 304. In this manner, the receiver component 314 can use its stored data to modulate the load resistance on the NFC antenna coil 306 and transfer its stored data from the remote NFC device 304. This describes the basic, one-way "listening", such as would be used in an identity card, tag, etc. transmitter component 312 may be used with receiver component 314 for two-way "read-write" communications.

In an aspect, NFC device 302 may tune to different frequency modes of operation based on the distance 310 between the NFC device 302 and the remote NFC device 304. In such an aspect, a variable capacitance may be used with at least one of capacitors 324 and 326. Further, the variable capacitance may be determined from a trim capacitor (Ctrim) look up table (LUT) 322. In such an aspect, the distance 310 may be used to determine the Ctrim 324 from the Ctrim LUT 322. In operation, where proximity sensor 308 determines a distance 310 that may be within a threshold value of a "close" distance, a first operational frequency may be used so as to reduce coupling and improve demodulation at the "close" (e.g., 0 mm) distance 310. In another optional aspect, where proximity sensor 308 determines a distance 310 that may be within a threshold value of a "far" (e.g., default) distance, a second operational frequency may be used so as to improve demodulation at the "far" (e.g., 40 mm) distance 310. In another aspect, Ctrim LUT 322 may enable off tuning of NFC antenna coil 306 so as to increase a bandwidth of modulation.

Figure 4:
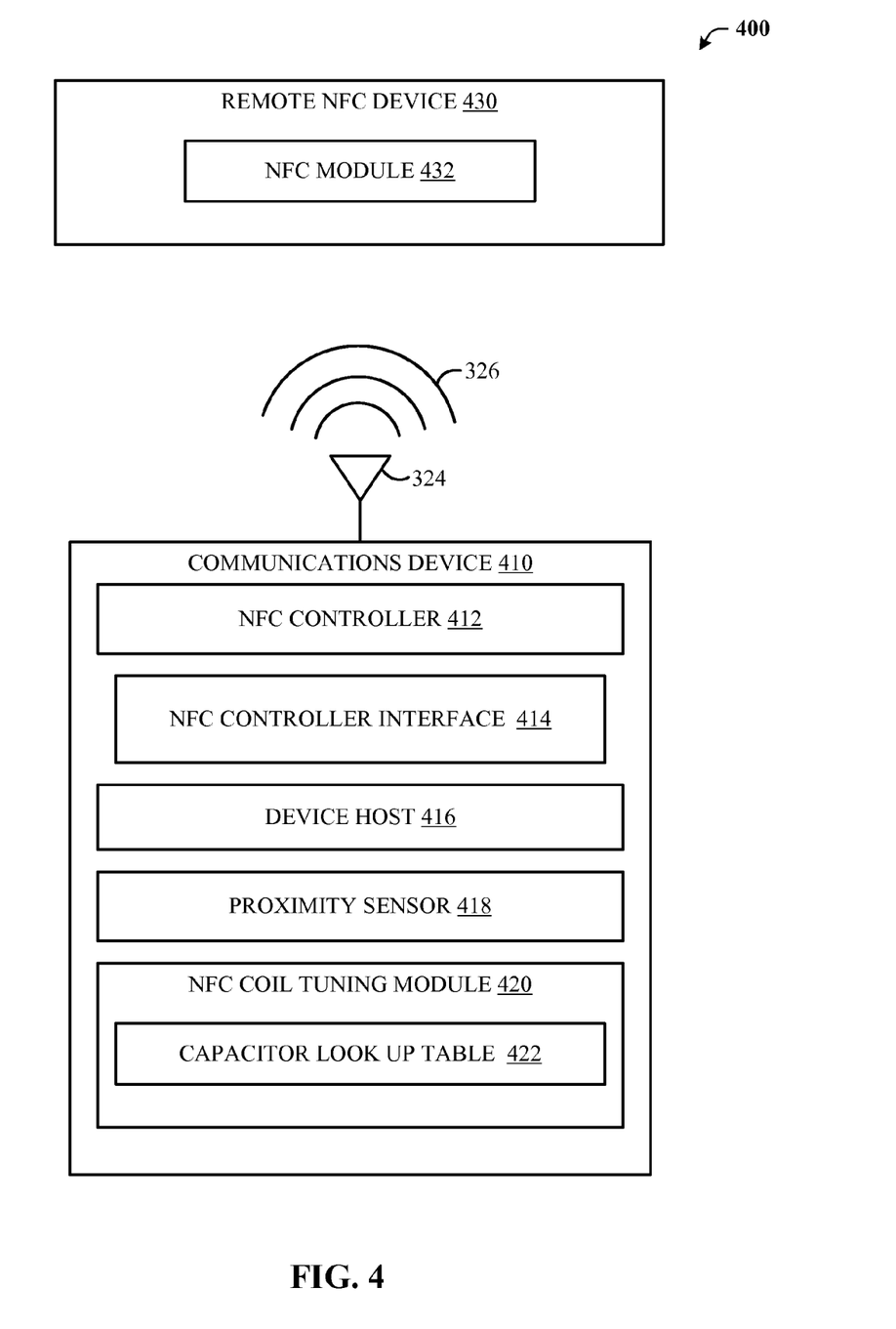
FIG. 4 is a block diagram of another NFC environment, according to an aspect.

With reference to FIG. 4, a block diagram of a communication network 400 according to an aspect is illustrated. Communication network 400 may include communications device 410 which, through antenna 424, may be in communication with a remote NFC device 430 using one or more NFC technologies 426 (e.g., NFC-A, NFC-B, NFC-F, etc.). In another aspect, communications device 410 may be configured to be connected to an access network and/or core network (e.g., a CDMA network, a GPRS network, a UMTS network, and other types of wireline and wireless communication networks).

In an aspect, communications device 410 may include a NFC controller 412, a NFC controller interface (NCI) 414, and a device host 416. In an aspect, communications device 410 may further include a proximity sensor 418 and a NFC coil tuning module 420. In operation, device host 416 may be configured to obtain, through NCI 414, and NFC Controller 412 information from remote NFC device 430 through NFC module 432 associated with remote NFC device 430.

As part of establishing a communication link, NFC coil tuning module 420 may be configured to tune a NFC coil (e.g., antenna 424) based at least on a distance between the communications device 410 and remote NFC device 430. In an aspect, the distance between the NFC devices may be determined using proximity sensor 418.

In operation, communications device 410 may use a proximity sensor/switch 418 to detect the distance (e.g., 0 millimeters (mm) 10 mm, 20 mm, 40 mm, etc.) from a remote NFC device 430. Further, NFC coil tuning module 420 may retune a NFC coil based on the detected distance to a Tag, Reader, etc. In such an aspect, the NFC device may change a capacitance of a receiver high voltage capacity bank to optimize performance at an operational mode associated with the detected distance. In an aspect, the capacitance may be changed using a capacitor look up table 422. In such an aspect, a distance obtained by proximity sensor 418 may be used with capacitor look up table 422 to determine an operational capacitance. Further, the capacitance change may change a resonance frequency of a antenna 424. Further, retuning the NFC coil may affect timing of received frames. As such, NFC coil tuning module 420 may be configured to alter a data decision point based on a shift in a Frame Delay Time (FDT). Further, distortion of a RF path may involve additional corrections in time for improved data detection of load modulation.

In an operational aspect, the communications device 410 may switch between two operational modes (e.g., a close mode and a distant mode). Although only two modes are described herein, one of ordinary skill in the art understands that any number of operational modes may be configured. Continuing the operational aspect, a close mode may have a NFC coil setting to reduce coupling and improve received signal demodulation at approximately 0 mm. Further, a distant mode may have a NFC coil setting to reduce coupling and improve received signal demodulation at approximately 40 mm. In another aspect, where the NFC is configured with a frequency that is off tune from the close mode, a useful bandwidth may be increased, but coupling may be reduced which may result in reduce load modulation pulse shaping in BPSK.

Accordingly, communications network 400 provides an environment in which a communications device 410 may be configured to improve tuning of a NFC coil for operation in one or more modes based on a distance between the communications device 410 and a remote NFC device 430.

Figure 5:
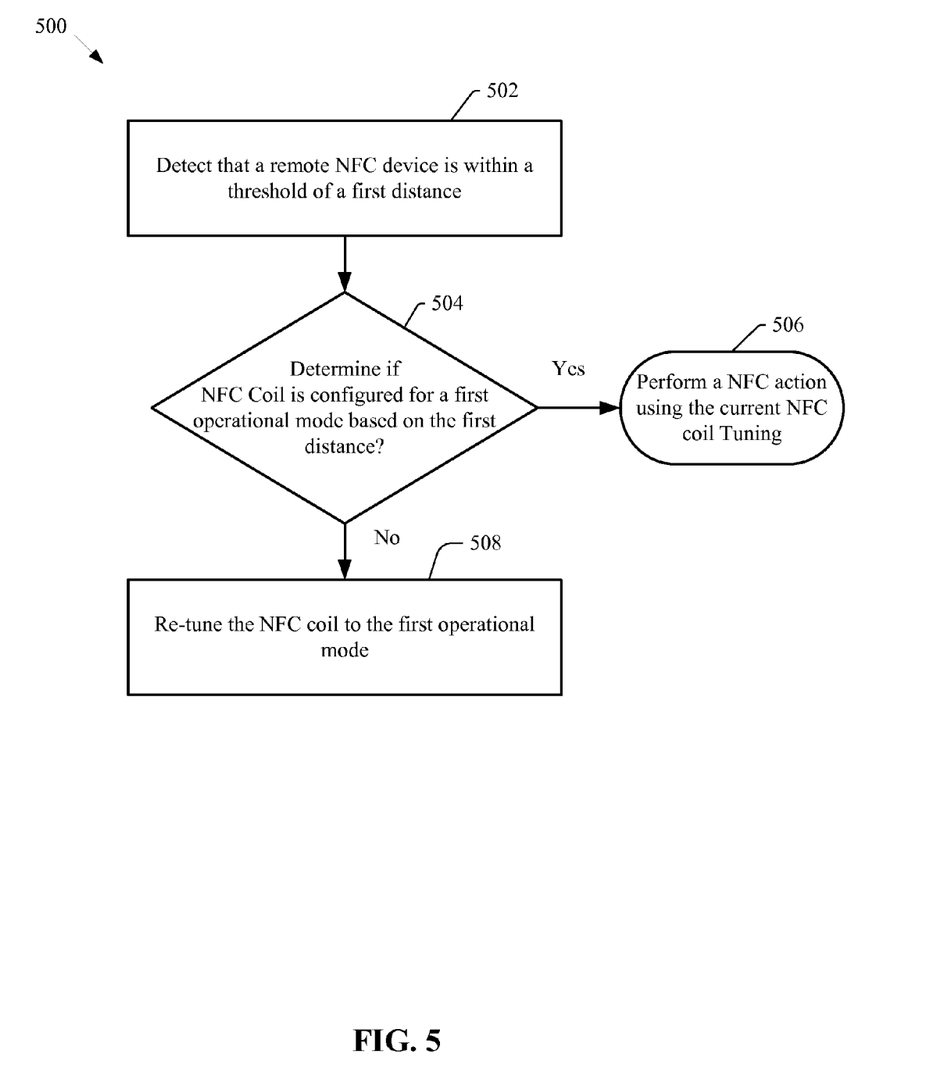
FIG. 5 is a flowchart diagram describing an example for improving tuning of a NFC coil for operation in one or more modes based on a distance between a NFC device and a remote NFC device, according to an aspect.

FIG. 5 illustrates methodologies in accordance with various aspects of the presented subject matter. While the methodologies are shown and described as a series of acts or sequence steps for the purposes of simplicity of explanation, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 5, a flowchart describing an example process 500 for improving NFC coil tuning in a NFC device is illustrated.

At block 502, a NFC device may detect that a remote NFC device is within a threshold of a first distance. In an aspect, the detecting may include using a proximity sensor associated with the NFC device. In another aspect, the first distance may be a value, such as, 0 mm, 50 mm, 40 mm, etc. In an aspect, the detecting may include monitoring use of one or more applications (e.g., software applications) and predicting use of the NFC device within a threshold period of time based on the monitored application usage. In another aspect, the detecting may include monitoring information obtained by one or more sensors, and predicting use of the NFC device within a threshold period of time based on the monitored sensor information.

At block 504, the NFC device may determine whether a NFC coil is configured for a first operational mode associated with the first distance.

If at block 504, the NFC device determines that the NFC coil is configured for the first operational mode associated with the first distance, then at block 506, the NFC device may perform a NFC action with a remote NFC device using the NFC coil tuned to the first operational mode.

By contrast, if at block 504, the NFC device determines that the NFC coil is not configured for the first operational mode associated with the first distance, then at block 508, the NFC device re-tunes the NFC coil to the first operational mode. In an aspect, retuning the NFC coil may include changing a receiver capacitance to tune a resonance frequency for use with the first operational mode. In such an aspect, changing a receiver capacitance may include changing a value associated high voltage capacitor bank. In another aspect, changing a receiver capacitance may include using a capacitor look up table.

Figure 6:
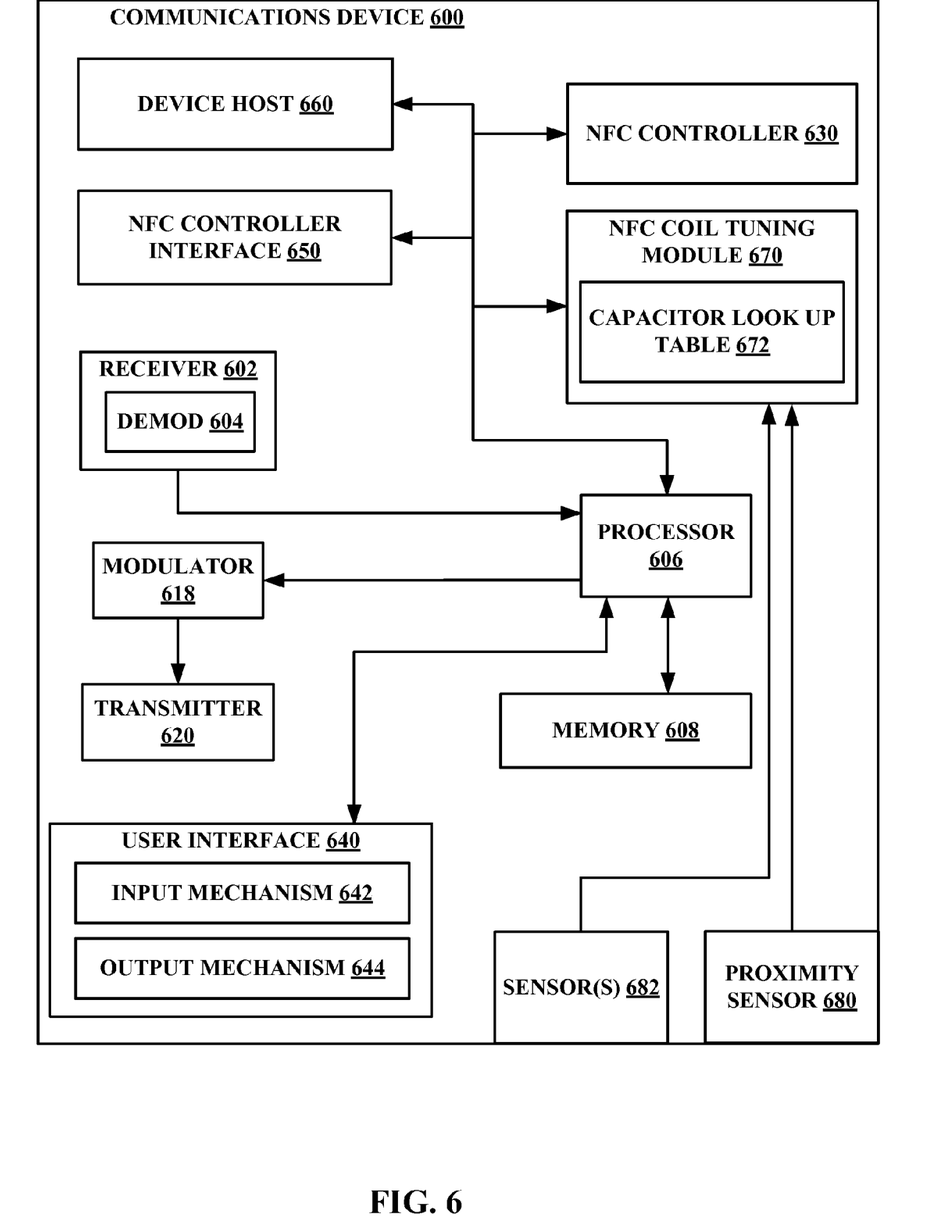
FIG. 6 is a functional block diagram example architecture of a communications device, according to an aspect.

While referencing FIG. 4, but turning also now to FIG. 6, an example architecture of communications device 600 is illustrated. As depicted in FIG. 6, communications device 600 includes receiver 602 that receives a signal from, for instance, a receive antenna (not shown), performs typical actions on (e.g., filters, amplifies, downconverts, etc.) the received signal, and digitizes the conditioned signal to obtain samples. Receiver 602 can include a demodulator 604 that can demodulate received symbols and provide them to processor 606 for channel estimation. Processor 606 can be a processor dedicated to analyzing information received by receiver 602 and/or generating information for transmission by transmitter 620, a processor that controls one or more components of communications device 600, and/or a processor that both analyzes information received by receiver 602, generates information for transmission by transmitter 620, and controls one or more components of communications device 600. Further, signals may be prepared for transmission by transmitter 620 through modulator 618 which may modulate the signals processed by processor 606.

Communications device 600 can additionally include memory 608 that is operatively coupled to processor 606 and that can store data to be transmitted, received data, information related to available channels, TCP flows, data associated with analyzed signal and/or interference strength, information related to an assigned channel, power, rate, or the like, and any other suitable information for estimating a channel and communicating via the channel.

Further, at least one of processor 606 or NFC coil tuning module 670 can provide means for detecting that communications device 600 is within a first threshold of a first distance from a remote NFC device, means for determining whether a NFC coil is tuned for use with a first operational mode associated with the first distance, and means for re-tuning the NFC coil to the first operational mode based on a determination that the NFC coil is not tuned for use with the first operational mode.

It will be appreciated that data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 608 of the subject systems and methods may comprise, without being limited to, these and any other suitable types of memory.

Communications device 600 may include NFC controller interface (NCI) 650. In an aspect, NCI 650 may be configured to enable communications between a NFC controller 630 and device host 660.

Communications device 600 may include NFC coil tuning module 670. As part of establishing a communication link, NFC coil tuning module 670 may be configured to tune a NFC coil based at least on a distance between the communications device 600 and a remote NFC device. In an aspect, the distance between the NFC devices may be determined using proximity sensor 680. Further, NFC coil tuning module 670 may change a capacitance of a receiver high voltage capacity bank to optimize performance at an operational mode associated with the detected distance. In an aspect, the capacitance may be changed using a capacitor look up table 672. In such an aspect, a distance obtained by proximity sensor 680 may be used with capacitor look up table 672 to determine an operational capacitance.

In an optional aspect, NFC coil tuning module 670 may be configured to attempt to predict an operational mode of use from one or more sensor 682 measurements and/or application (e.g., software application) uses. In other words, a distance and/or imminent action by the communications device 600 may be predicted using information obtained from one or more applications and/or sensors 682. For example, NFC coil tuning module 670 may use imminent use of a NFC payment application to initiate re-tuning the NFC coil (e.g. Credit card transaction software application compared to a default Mass transit software application). In another example, NFC coil tuning module 670 may use imminent use of Mass transit or ticketing event may be predicted via location services, time of day detection, etc. (e.g., one or more sensors 682) to initiate NFC coil tuning and/or re-tuning.

Additionally, communications device 600 may include user interface 640. User interface 640 may include input mechanisms 642 for generating inputs into communications device 600, and output mechanism 644 for generating information for consumption by the user of the communications device 600. For example, input mechanism 642 may include a mechanism such as a key or keyboard, a mouse, a touch-screen display, a microphone, etc. Further, for example, output mechanism 644 may include a display, an audio speaker, a haptic feedback mechanism, etc. In the illustrated aspects, the output mechanism 644 may include a display configured to present media content that is in image or video format or an audio speaker to present media content that is in an audio format.

Figure 7:
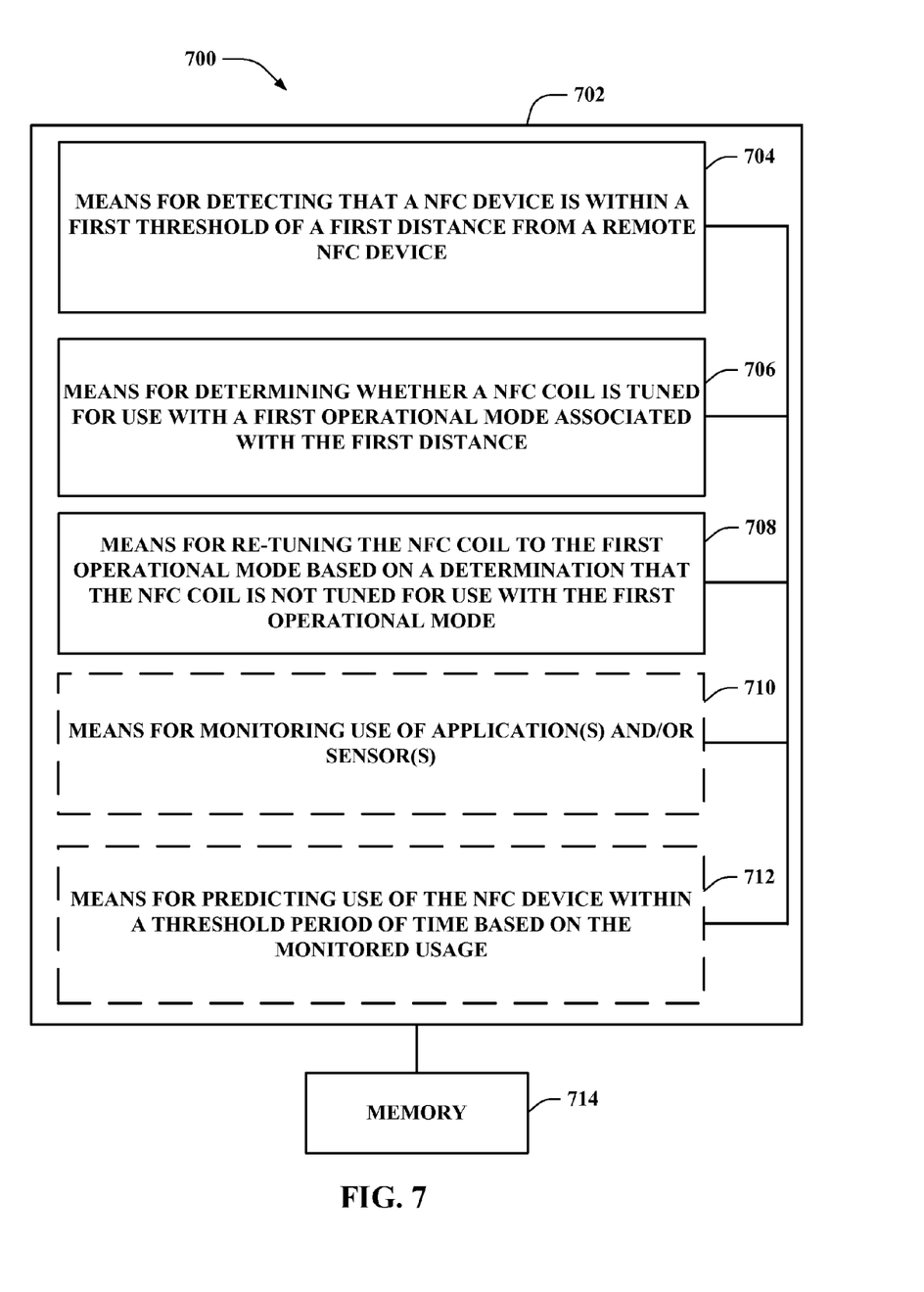
FIG. 7 is a functional block diagram of an example communication system for improving tuning of a NFC coil for operation in one or more modes based on a distance between a NFC device and a remote NFC device, according to an aspect.

FIG. 7 is a block diagram depicting an exemplary communication system 700 configured to improve tuning of a NFC coil for operation in one or more modes based on a distance between a NFC device and a remote NFC device, according to an aspect. For example, system 700 can reside at least partially within a communications device (e.g., communications device 600). It is to be appreciated that system 700 is represented as including functional blocks, which can represent functions implemented by a processor, software, or combination thereof (e.g., firmware). System 700 includes a logical grouping 702 of electrical components that can act in conjunction.

For instance, logical grouping 702 can include an electrical component that may provide means for detecting that a NFC device is within a first threshold of a first distance from a remote NFC device 704. In an aspect, the means for detecting 704 may include means for using a proximity sensor associated with the NFC device to detect the first distance.

Further, logical grouping 702 can include an electrical component that may provide means for determining whether a NFC coil is tuned for use with a first operational mode associated with the first distance 706. In an aspect, the means for determining may include processor 606, NFC coil tuning module 670, and/or any combination thereof. In an aspect, the first operational mode may include a tag reading mode. In such an aspect, the first distance may be approximately 40 mm. In another aspect, the first operational mode may include interactions with a POS terminal, a peer device, a reader/writer, etc. In such an aspect, the first distance may where the NFC and the remote NFC device are approximately touching (e.g., 0 mm).

Further, logical grouping 702 can include an electrical component that may provide means for re-tuning the NFC coil to the first operational mode based on a determination that the NFC coil is not tuned for use with the first operational mode 708. In an aspect, the means for re-tuning 708 may include means for re-tuning to the first operational mode from a second operational mode. In such an aspect, the second operational mode may be used for performing a NFC action within a second threshold of a second distance from the remote NFC device. In another aspect, the means for re-tuning 708 may further include means for changing a receiver capacitance to tune a resonance frequency for use with the first operational mode. In such an aspect, the means for re-tuning 708 may further include means for changing a value associated with a high voltage capacitor bank. Further, in such an aspect, the means for re-tuning 708 may further include using a capacitor look up table.

Further, in an optional logical grouping 702 can include an electrical component that may provide means for monitoring use of one or more applications and/or one or more sensors 710. In an aspect, the one or more sensors may include, but are not limited to, a light sensor, a motion sensor, an auditory sensor (e.g., microphone), a location sensor (e.g., GPS monitor), etc. In an aspect, the applications may include software, firmware, and/or hardware applications.

Moreover, in an optional logical grouping 702 can include an electrical component that may provide means for predicting use of the NFC device within a threshold period of time based on the monitored application usage and/or sensor information 712.

Additionally, system 700 can include a memory 714 that retains instructions for executing functions associated with the electrical components 704, 706, 708, 710, and 712, stores data used or obtained by the electrical components 704, 706, 708, 710, 712, etc. While shown as being external to memory 714, it is to be understood that one or more of the electrical components 704, 706, 708, 710, and 712 may exist within memory 714. In an example, electrical components 704, 706, 708, 710, and 712 can include at least one processor, or each electrical component 704, 706, 708, 710, and 712 can be a corresponding module of at least one processor. Moreover, in an additional or alternative example, electrical components 704, 706, 708, 710, and 712 may be a computer program product including a computer readable medium, where each electrical component 704, 706, 708, 710, and 712 may be corresponding code.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, mobile equipment (ME), remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH, near-field communications (NFC-A, NFC-B, NFC,-f, etc.), and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules configured to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of wireless communications, comprising:
    detecting that a near field communication (NFC) device is within a first threshold of a first distance from a remote NFC device;
    determining that a NFC coil of the NFC device is not tuned for use with a first operational mode associated with the first distance, wherein the first operational mode comprises one of a plurality of operational modes of the NFC device, and wherein each of the plurality of operational modes is associated with a unique NFC action; and
    tuning the NFC coil for use with the first operational mode based on a determination that the NFC coil is not tuned for use with the first operational mode.

2. The method of claim 1, wherein the detecting further comprises using a proximity sensor associated with the NFC device to detect the first distance.

3. The method of claim 1, wherein the first distance is approximately zero millimeters (mm), wherein the remote NFC device is a tag, and wherein the first operational mode comprises reading the tag.

4. The method of claim 1, wherein the first distance is approximately 40 mm, wherein the remote NFC device is a point of sale (POS) terminal, and wherein the first operational mode comprises interacting with the POS terminal.

5. The method of claim 1, wherein the tuning further comprising tuning to the first operational mode from a second operational mode, wherein the second operational mode is used for performing a NFC action within a second threshold of a second distance from the remote NFC device.

6. The method of claim 1, wherein the tuning further comprising changing a receiver capacitance to tune a resonance frequency for use with the first operational mode.

7. The method of claim 6, wherein the changing the receiver capacitance further comprises changing a value associated with a high voltage capacitor bank.

8. The method of claim 6, wherein the changing the receiver capacitance further comprises using a capacitor look up table.

9. The method of claim 1, wherein the detecting further comprises:
    monitoring use of one or more applications; and predicting use of the NFC device within a threshold period of time based on the monitored use of the one or more applications.

10. The method of claim 1, wherein the detecting further comprises:
monitoring information obtained by one or more sensors; and
predicting use of the NFC device within a threshold period of time based on the information obtained by the one or more sensors.

11. A non-transitory computer-readable medium storing computer executable code comprising:
code for detecting that a near field communication (NFC) device is within a first threshold of a first distance from a remote NFC device;
code for determining that a NFC coil of the NFC device is not tuned for use with a first operational mode associated with the first distance, wherein the first operational mode comprises one of a plurality of operational modes of the NFC device, and wherein each of the plurality of operational modes is associated with a unique NFC action; and
code for tuning the NFC coil for use with the first operational mode based on a determination that the NFC coil is not tuned for use with the first operational mode.

12. The computer-readable medium of claim 11, wherein the computer executable code further comprises code for using a proximity sensor associated with the NFC device to detect the first distance.

13. The computer-readable medium of claim 11, wherein the first distance is approximately zero millimeters (mm), wherein the remote NFC device is a tag, and wherein the computer executable code further comprises code for reading the tag.

14. The computer-readable medium of claim 11, wherein the first distance is approximately 40 mm, wherein the remote NFC device is a point of sale (POS) terminal, and wherein the computer executable code further comprises code for interacting with the POS terminal.

15. The computer-readable medium of claim 11, wherein the computer executable code further comprises code for tuning to the first operational mode from a second operational mode, wherein the second operational mode is used for performing a NFC action within a second threshold of a second distance from the remote NFC device.

16. The computer-readable medium of claim 11, wherein the computer executable code further comprises code for changing a receiver capacitance to tune a resonance frequency for use with the first operational mode.

17. The computer-readable medium of claim 16, wherein the computer executable code further comprises code for changing a value associated with a high voltage capacitor bank.

18. The computer-readable medium of claim 16, wherein the computer executable code further comprises code for using a capacitor look up table.

19. The computer-readable medium of claim 11, wherein the computer executable code further comprises:
code for monitoring use of one or more applications; and
code for predicting use of the NFC device within a threshold period of time based on the monitored use of the one or more applications.

20. The computer-readable medium of claim 11, wherein the computer executable code further comprises:
code for monitoring information obtained by one or more sensors; and
code for predicting use of the NFC device within a threshold period of time based on the information obtained by the one or more sensors.

21. An apparatus for communication, comprising:
means for detecting that a near field communication (NFC) device is within a first threshold of a first distance from a remote NFC device;
means for determining that a NFC coil of the NFC device is not tuned for use with a first operational mode associated with the first distance, wherein the first operational mode comprises one of a plurality of operational modes of the NFC device, and wherein each of the plurality of operational modes is associated with a unique NFC action; and
means for tuning the NFC coil for use with the first operational mode based on a determination that the NFC coil is not tuned for use with the first operational mode.

22. The apparatus of claim 21, wherein the means for detecting further comprises means for using a proximity sensor associated with the NFC device to detect the first distance.

23. The apparatus of claim 21, wherein the first distance is approximately zero millimeters (mm), wherein the remote NFC device is a tag, and wherein the first operational mode comprises means for reading the tag.

24. The apparatus of claim 21, wherein the first distance is approximately 40 mm, wherein the remote NFC device is a point of sale (POS) terminal, and wherein the first operational mode comprises means for interacting with the POS terminal.

25. The apparatus of claim 21, wherein the means for tuning further comprising means for tuning to the first operational mode from a second operational mode, wherein the second operational mode is used for performing a NFC action within a second threshold of a second distance from the remote NFC device.

26. The apparatus of claim 21, wherein the means for tuning further comprising means for changing a receiver capacitance to tune a resonance frequency for use with the first operational mode.

27. The apparatus of claim 26, wherein the means for changing the receiver capacitance further comprises means for changing a value associated with a high voltage capacitor bank.

28. The apparatus of claim 26, wherein the means for changing the receiver capacitance further comprises means for using a capacitor look up table.

29. The apparatus of claim 21, wherein the means for detecting further comprises:
means for monitoring use of one or more applications; and
means for predicting use of the NFC device within a threshold period of time based on the monitored use of the one or more applications.

30. The apparatus of claim 21, wherein the means for detecting further comprises:
means for monitoring information obtained by one or more sensors; and
means for predicting use of the NFC device within a threshold period of time based on the information obtained by the one or more sensors.

31. An apparatus for communication, comprising:
a memory;
a processor coupled to the memory;
a near field communication (NFC) coil tuning module coupled to at least the processor and configured to:
detect that the apparatus is within a first threshold of a first distance from a remote NFC device;
determine that a NFC coil of the apparatus is not tuned for use with a first operational mode associated with the first distance, wherein the first operational mode comprises one of a plurality of operational modes of the NFC device, and wherein each of the plurality of operational modes is associated with a unique NFC action; and tune the NFC coil for use with the first operational mode based on a determination that the NFC coil is not tuned for use with the first operational mode.

32. The apparatus of claim 31, wherein the apparatus further comprises a proximity sensor that is configured to detect the first distance.

33. The apparatus of claim 31, wherein the first distance is approximately zero millimeters (mm), wherein the remote NFC device is a tag, and wherein the apparatus is configured to read the tag.

34. The apparatus of claim 31, wherein the first distance is approximately 40 mm, wherein the remote NFC device is a point of sale (POS) terminal, and wherein the apparatus is configured to interact with the POS terminal.

35. The apparatus of claim 31, wherein the NFC coil tuning module is configured to tune to the first operational mode from a second operational mode, wherein the second operational mode is used for performing a NFC action within a second threshold of a second distance from the remote NFC device.

36. The apparatus of claim 31, wherein the NFC coil tuning module is configured to change a receiver capacitance to tune a resonance frequency for use with the first operational mode.

37. The apparatus of claim 36, wherein the NFC coil tuning module is configured to change a value associated with a high voltage capacitor bank.

38. The apparatus of claim 36, wherein the NFC coil tuning module is configured to use a capacitor look up table.

39. The apparatus of claim 31, wherein the apparatus further comprises one or more application, and wherein the NFC coil tuning module is configured to:

monitor use of one or more applications; and predict use of the NFC device within a threshold period of time based on the monitored use of the one or more applications.

40. The apparatus of claim 31, wherein the apparatus further comprises one or more sensors, and wherein the NFC coil tuning module is configured to:

monitor information obtained by the one or more sensors; and predict use of the NFC device within a threshold period of time based on the information obtained by the one or more sensors.

* * * * *